US006925401B2

(12) United States Patent
Kameya

(10) Patent No.: US 6,925,401 B2
(45) Date of Patent: Aug. 2, 2005

(54) METHOD AND APPARATUS FOR CORRECTING RESOLVER OUTPUT

(75) Inventor: Hisashi Kameya, Kariya (JP)

(73) Assignee: Denso Corporation, Kariya (JP)

( * ) Notice: Subject to any disclaimer, the term of this patent is extended or adjusted under 35 U.S.C. 154(b) by 49 days.

(21) Appl. No.: 10/612,017

(22) Filed: Jul. 3, 2003

(65) Prior Publication Data

US 2004/0010386 A1 Jan. 15, 2004

(30) Foreign Application Priority Data

Jul. 12, 2002 (JP) ......................................... 2002-204665

(51) Int. Cl.$^7$ ........................... G01D 18/00; H03M 1/48
(52) U.S. Cl. ........................................ 702/87; 341/112
(58) Field of Search ....................... 702/87; 73/862.331, 73/862.326; 341/112, 116

(56) References Cited

U.S. PATENT DOCUMENTS

| | | | | | |
|---|---|---|---|---|---|
| 3,974,498 | A | * | 8/1976 | Knier ........................... | 341/115 |
| 4,529,922 | A | * | 7/1985 | Ono ............................. | 318/603 |
| 4,933,674 | A | * | 6/1990 | Gasperi et al. .............. | 341/116 |
| 5,239,490 | A | * | 8/1993 | Masaki et al. ................ | 702/41 |
| 5,241,268 | A | * | 8/1993 | Lee ........................ | 324/207.25 |
| 5,796,231 | A | * | 8/1998 | Kyodo ......................... | 318/608 |
| 5,912,638 | A | * | 6/1999 | Vlahu .......................... | 341/116 |
| 6,363,797 | B1 | * | 4/2002 | Tokumoto ............... | 73/862.328 |
| 6,539,329 | B2 | * | 3/2003 | Kato et al. ................... | 702/151 |
| 6,615,152 | B2 | * | 9/2003 | Fujimoto et al. ............. | 702/94 |
| 6,683,774 | B2 | * | 1/2004 | Kameya et al. ............. | 361/139 |
| 2001/0054911 | A1 | * | 12/2001 | Kobayashi et al. ......... | 324/772 |
| 2002/0124663 | A1 | * | 9/2002 | Tokumoto et al. ..... | 73/862.333 |

OTHER PUBLICATIONS

Hanselman, Signal Processing Techniques for Improved resolver–To–Digital Conversion Accuracy, 1990 IEEE.*
Oyama et al., Sensor–less Control of a Half–Wave Rectified Brushless Synchronous Motor, 1995 IEEE.*
Murray et al., Resolver Position Sensing System with Integrated Fault Detection for Automotive Applications, 2002 IEEE.*

* cited by examiner

*Primary Examiner*—John Barlow
*Assistant Examiner*—Toan M. Le
(74) *Attorney, Agent, or Firm*—Posz Law Group, PLC

(57) ABSTRACT

A resolver output correction device receives sine output signal and cosine output signal from a resolver. Each of the sine output signal and the cosine output signal has an offset error and a gain differential error due to a secular variation. The correction device detects maximal and minimal values with respect to both the sine output signal and the cosine output signal. It calculates average values between the maximal values and the minimal values. Then, it corrects the offsets of the signals based on the average values. It also calculates gain differentials between the maximal value and the minimal value with respect to both the sine and cosine signals. Then, it corrects the gain differentials of the signals based on the calculated gain differentials. As a result, both the offset and gain errors of the signals are corrected with accuracy.

6 Claims, 4 Drawing Sheets

METHOD AND APPARATUS FOR CORRECTING RESOLVER OUTPUT

REFERENCE TO RELATED APPLICATIONS

This application is based on Japanese Patent Application No. 2002-204665 filed on Jul. 12, 2002, the contents of which are incorporated herein by reference.

BACKGROUND OF THE INVENTION

1. Field of the Invention

The present invention relates to a method and an apparatus for correcting a resolver output, more particularly to correcting an offset error and a gain error of the resolver output.

2. Description of Related Art

Resolvers are rotational angle sensors that are commonly used for sensing rotational angles of rotary devices, such as engines and vehicular motors. The resolvers have windings for producing magnetic flux linked to the windings. However, an amount of the magnetic flux changes over time, and the resolvers have variations in the amount of the magnetic flux during manufacturing. This results in worsening accuracy of detecting the rotational angle.

In detail, the resolver produces a sine output signal and a cosine output signal. The sine output signal is expressed by an equation, $(G+\Delta G1)\cdot(\sin \omega t \times \sin \theta)+(Vb+\Delta V1)$. The cosine output signal is expressed by another equation, $(G+\Delta G2)\cdot(\sin \omega t \times \cos \theta)+(Vb+\Delta V2)$.

In the equation, "$\theta$" is a detection angle, "$\sin \omega t$" is a carrier wave signal, "G" is a model gain of the resolver (for example, 2.5), and "Vb" is a bias voltage (for example, 2.5 volt). "$\Delta G1$" is a gain variation (deviation) of the sine output signal, "$\Delta G2$" is a gain variation of the cosine output signal, "$\Delta V1$" is an offset variation of the sine output signal, and "$\Delta V2$" is an offset variation of the cosine output signal. Further, the sine output signal and the cosine output signal are produced as analog voltages.

Much expense in time, costs and efforts are required to ensure the accuracy for a long time and to reduce a detection error due to the changes of the gain and the offset. However, an advanced accuracy of the resolver is desired.

SUMMARY OF THE INVENTION

The present invention therefore has an object to provide a method and an apparatus for improving a rotational angle detection of a rotational device.

According to one aspect of the present invention, each of a method and an apparatus for correcting an offset of an output signal produced from a resolver includes a picking function, a calculating function, and a correcting function. The resolver detects a rotation of a rotary device, and produces the output wave signal. The picking function picks a maximal value and a minimal value from the output signal for a certain time period. The calculating function calculates an average value between the maximal value and the minimal value. Then, the correcting function corrects the offset of the output signal based on the average value.

According to another aspect of the present invention, each of a method and an apparatus for correcting a gain of an output signal produced from the resolver includes a picking function, a calculating function, and a correcting function. The picking function picks a maximal sine value and a minimal sine value from a sine output signal included in the output signal, and a maximal cosine value and a minimal cosine value from a cosine output signal included in the output signal for a certain time period. The calculating function calculates a first differential value between the maximal sine value and the minimal sine value, and a second differential value between the maximal cosine value and the minimal cosine value. Then, the correcting function corrects a gain differential between the sine output signal and the cosine output signal based on the first and second differential values.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
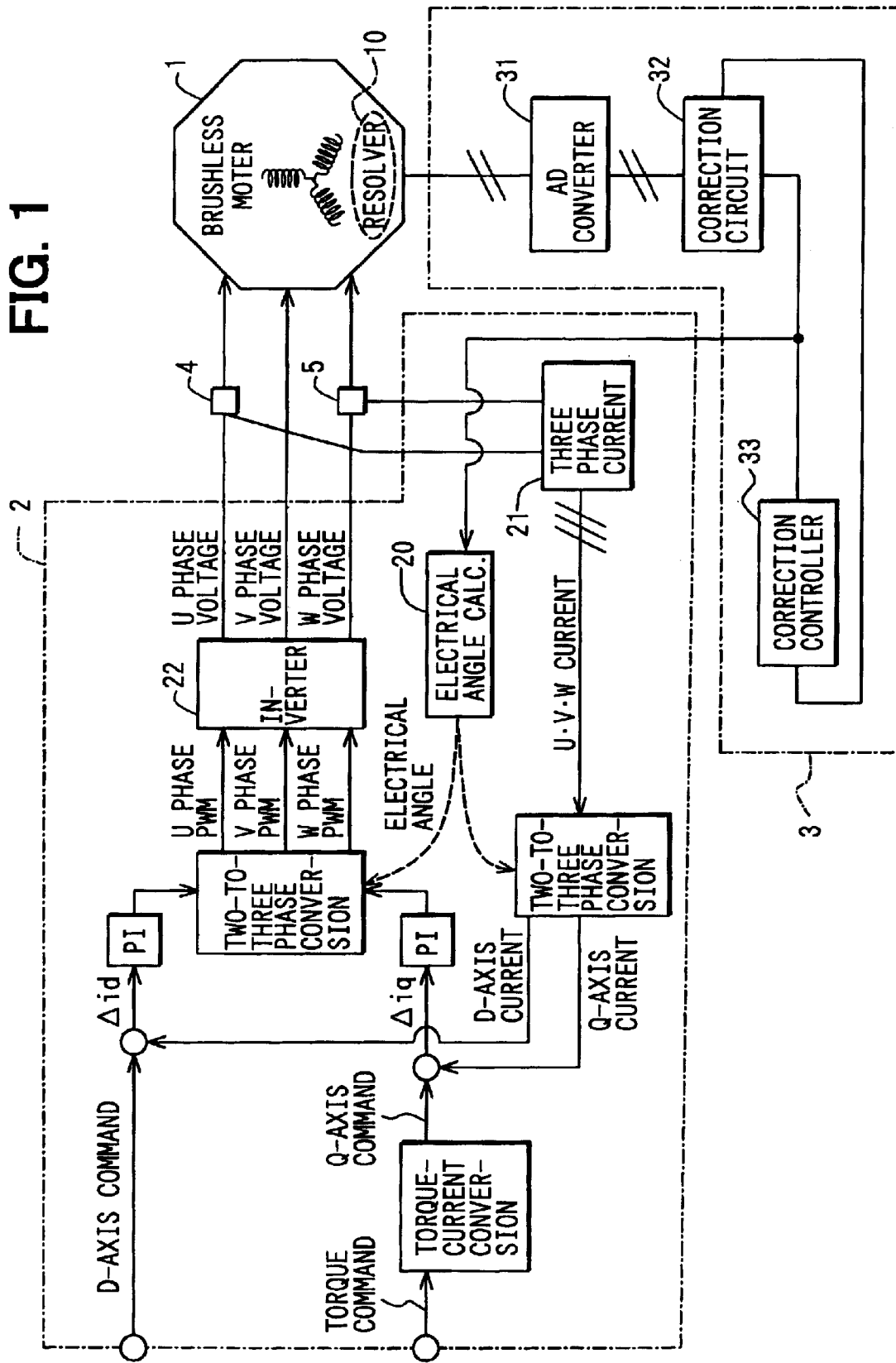
FIG. 1 shows a block diagram of a motor control system that has a resolver according to an embodiment of the present invention.

The preferred embodiments of the present invention will be explained with reference to the accompanying drawings. Referring to FIG. 1, a motor control system includes a brushless motor 1, a motor control device 2, a resolver output correction device 3, and current sensors 4, 5. The brushless motor 1 has a built-in resolver 10. The resolver output correction device 3 produces corrected output signals. The current sensors 4, 5 measure electric currents and produce current data relating to the electric currents.

Figure 2:
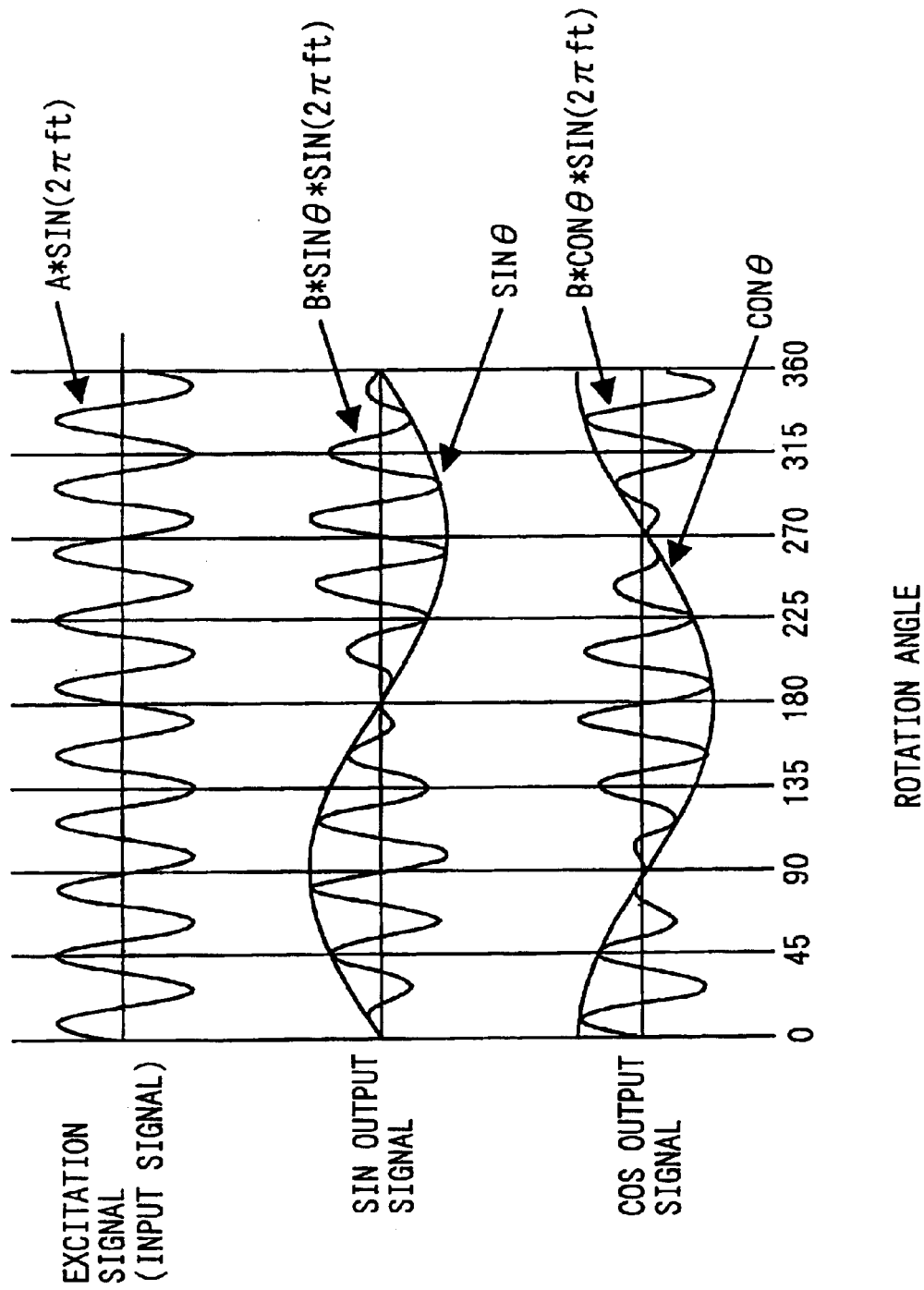
FIG. 2 shows waveforms of an input signal and output signals from the resolver according to the embodiment of the present invention.

The resolver 10 has a rotor that is fixed to a rotary shaft of the motor 1, and a stator that surrounds the rotor. A couple of output windings, which are electrically shifted by angle n/2 from each other, are wound around the stator. The couple of output windings produce sine wave output signal and cosine wave output signal. A carrier voltage is energized to excitation windings of the motor 1. Referring to FIG. 2, the sine wave output signal is the product of the carrier voltage and a sine value with respect to a rotational angle of the rotor. The cosine wave output signal is the product of the carrier voltage and a cosine value of the rotational angle of the rotor. The resolver 10 can also have a filter to eliminate carrier wave signal from the sine wave output signal and the cosine wave output signal.

The motor control device 2 includes an electrical angle calculation circuit 20, a three-phase current calculation circuit 21, and a three-phase inverter 22. The electrical angle calculation circuit 20 receives the corrected output signals from the resolver output correction device 3. It calculates a rotational angle of the motor 1 based on the corrected output signals. The three-phase current calculation circuit 21 receives the current data from the sensor 4, 5, and produces electric currents of three phases based on the current data. The three-phase inverter 22 controls three-phase voltages that are supplied to the motor 1 based on the rotational angle and the electric currents. A vector control is used for the motor 1. Since the vector control is well known technique for DC brushless motors, a detail description of the vector control is not described.

The resolver output correction device 3 is applied not only to the brushless motor control system, but also to a resolver for detecting a rotational angle of an internal combustion engine. The resolver output correction device 3 can be combined to the motor control device 2. In such a combined device, a correction operation can be applied to the sine output signal and the cosine output signal before calculation of the electrical angle, or to the calculated electrical angle of the sine signal and the cosine signal.

Referring to FIG. 1, the resolver output correction device 3 includes a couple of analog-to-digital (AD) converters 31, a correction circuit 32, and a correction controller 33. The AD converters 31 receive the sine wave output signal and the cosine wave output signal from the resolver 10, and convert them into digital sine signal and digital cosine signal with AD conversion. The correction circuit 32 corrects an offset and a gain of each of the digital sine signal and the digital cosine signal. The correction controller 33 modifies correction values for the offset correction and the gain correction. The correction circuit 32 sends the corrected digital signals to the electrical angle calculation circuit 20 of the motor control device 2.

Figure 3:
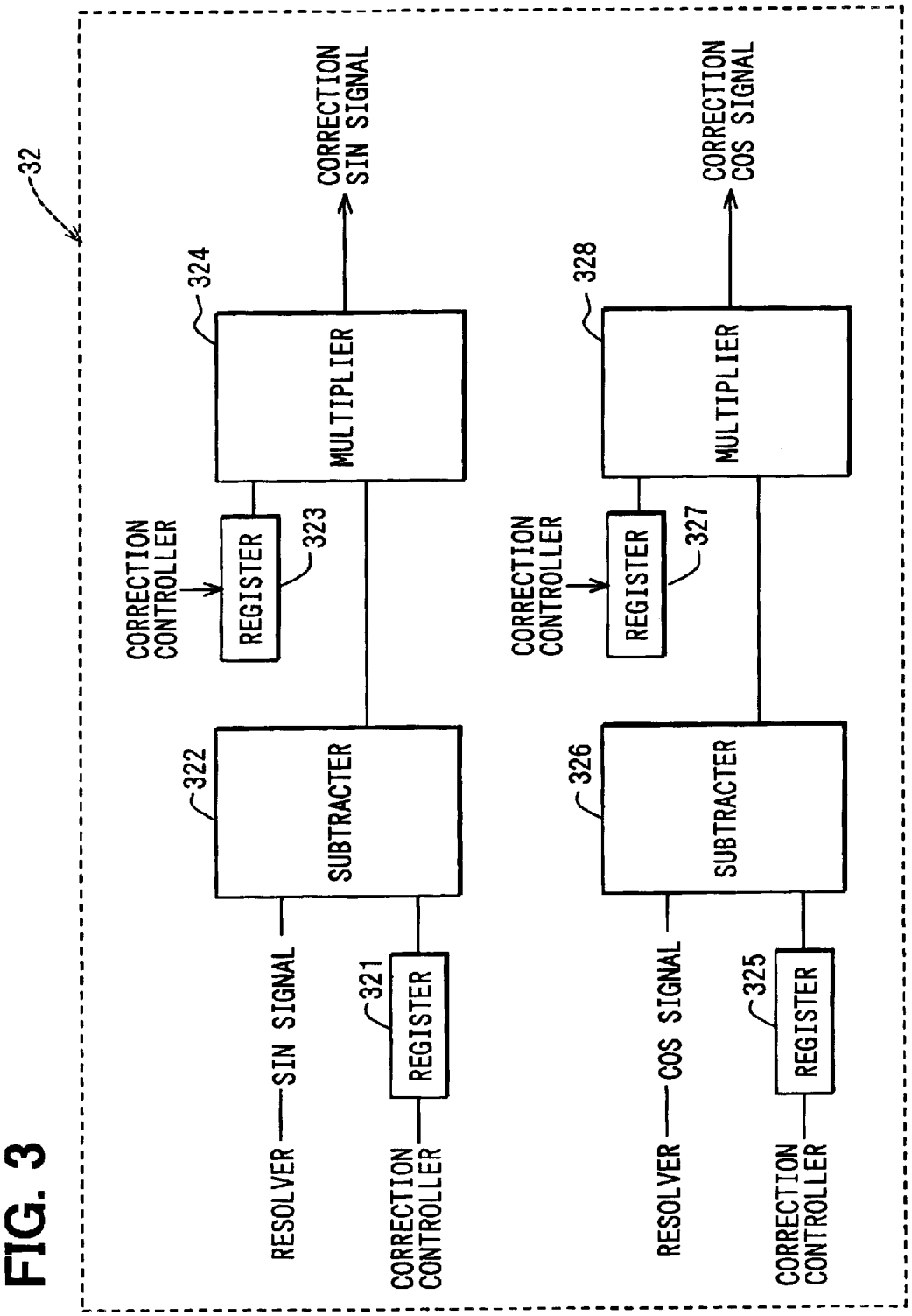
FIG. 3 shows a block diagram of a correction device according to the embodiment of the present invention.

Referring to FIG. 3, the correction circuit 32 has a first correction part for the digital sine signal and a second correction part for the digital cosine signal. The first correction part has a first register 321, a first subtracter 322, a second register 323, and a first multiplier 324. The second correction part has a third register 325, a second subtracter 326, a fourth register 327, and a second multiplier 328. The first register 321 stores the offset correction value for the sine signal. The first subtracter 322 performs a subtraction for the offset correction to the sine signal. The second register 323 stores the gain correction value for the sine signal. The first multiplier 324 performs a multiplication for the gain correction to the sine signal. The second register 325 stores the offset correction value for the cosine signal. The second subtracter 326 performs a subtraction for the offset correction to the cosine signal. The third register 327 stores the gain correction value for the cosine signal. The second multiplier 328 performs a multiplication for the gain correction to the cosine signal.

The first subtracter 322 receives the digital sine signal from the AD converters 31 and the offset correction value (zero value) from the first register 321. It subtracts the offset correction value from the digital sine signal so that a zero value of the digital sine signal becomes equal to a digital value corresponding to 2.5 volts. The first multiplier 324 receives the gain correction value from the second register 323 and the subtracted sine signal. It multiplies the subtracted sine signal by the gain correction value so that a maximal value of the digital sine signal becomes equal to a digital maximal value corresponding to 5 volts and a minimal value of the sine signal becomes equal to a digital minimal value corresponding to 0 volt.

The second subtracter 326 receives the digital cosine signal from the AD converters 31 and the offset correction value (zero value) from the third register 325. It subtracts the offset correction value from the digital cosine signal so that a zero value of the digital cosine signal becomes equal to a digital value corresponding to 2.5 volts. The second multiplier 328 receives the gain correction value from the fourth register 327 and the subtracted cosine signal. It multiplies the subtracted cosine signal by the gain correction value so that a maximal value of the digital cosine signal becomes equal to the digital maximal value corresponding to 5 volts and a minimal value of the cosine signal becomes equal to the digital minimal value corresponding to 0 volt.

The registers 321, 323, 325, 327 can have nonvolatile memories to maintain the correction values after being powered off. The correction circuit 32 is constructed of the hardware circuit, but the correction operation can be operated by software processes.

Figure 4:
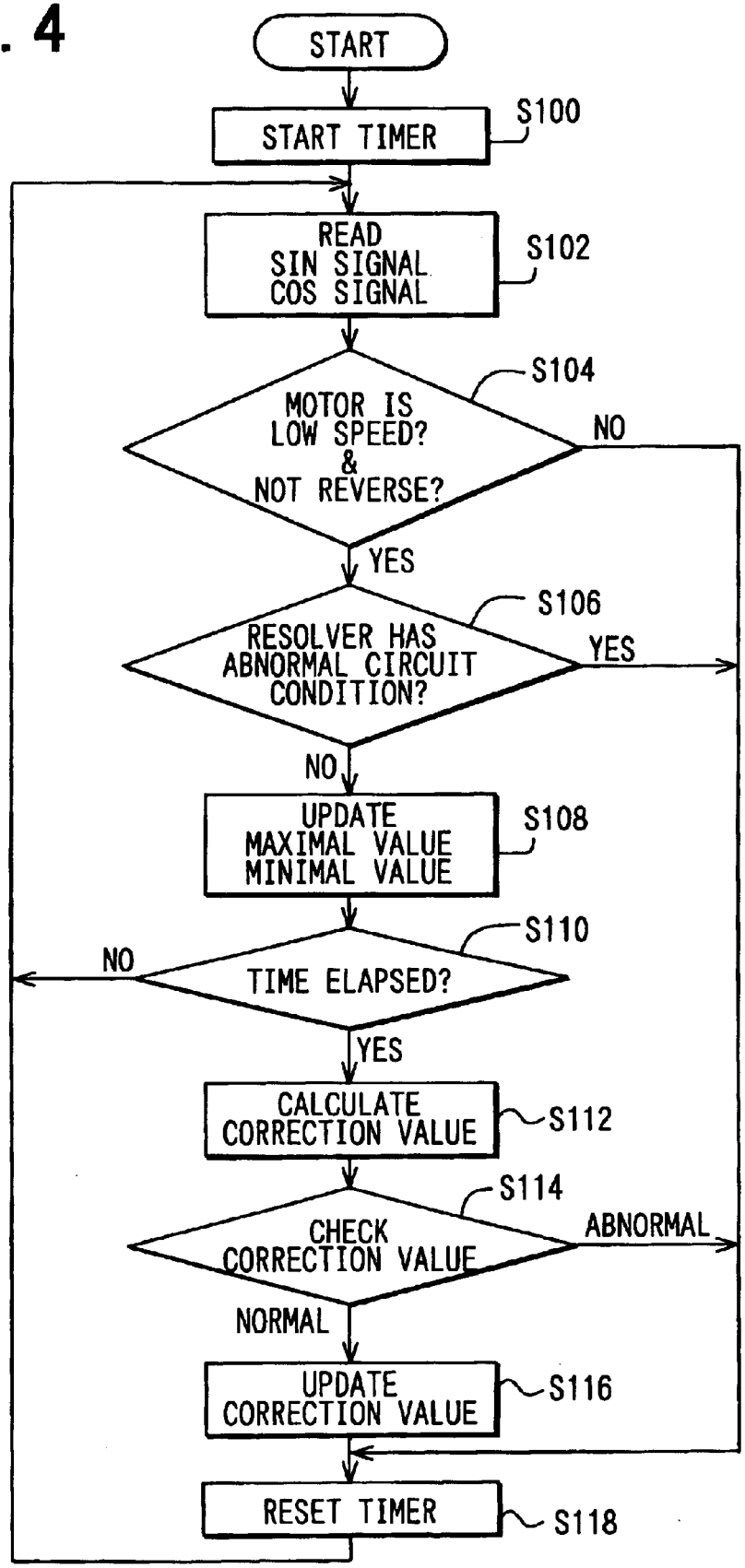
FIG. 4 shows a flowchart of an update operation of the correction values in a correction controller according to the embodiment of the present invention.

Referring to FIG. 4, the correction controller 33 calculates and updates the offset correction values and the correction gain values for the sine signal and the cosine signal. The controller 33 always operates to calculate and update the correction values all the time after power is turned on. The controller 33 stores a maximal sine value, a minimal sine value, a maximal cosine value, and a minimal cosine value in advance.

When the motor control system turns on, the controller 33 resets the correction operation, and starts a built-in timer (S100). The timer produces an alarm to indicate that a predetermined time elapses.

Then, the controller 33 reads the sine signal and the cosine signal (S102). It also determines whether a rotational speed of the motor 1 is not greater than a predetermined speed and a rotational direction of the motor 1 is not reversed based on the fluctuation of the sine signal and the cosine signal (S104). When the rotational speed is greater than the predetermined speed or the rotational direction is reversed (S104: NO), the operation proceeds to step S118. Otherwise (S104: YES), the operation proceeds to step S106.

The controller 33 determines whether the resolver 10 has an abnormal condition in a circuit of the resolver 10 (S106). When the resolver 10 has an abnormal circuit condition (S106: YES), the operation proceeds to step S118. Otherwise (S106: NO), the operation proceeds to step S108. The abnormal condition is determined by whether the sine wave output signal and the cosine wave output signal produced by the resolver 10 stay in a predetermined level, such as the maximal value and the minimal value. The abnormal condition can be determined by another way.

The controller 33 compares a present value of the sine signal with the stored maximal sine value and the stored minimal sine value. It also compares a present value of the cosine signal with the stored maximal cosine signal and the stored minimal cosine value. Then, it updates the maximal sine value to the present value if the present sine value is greater than the stored maximal sine value. It updates the minimal sine value to the present value if the present sine value is smaller than the stored minimal sine value. It also updates the maximal cosine value to the present value if the present cosine value is greater than the stored maximal cosine value. It updates the minimal cosine value to the present value if the present cosine value is smaller than the stored minimal cosine value.

Then, the controller 33 determines whether the predetermined time elapses. If the predetermined time does not elapse (S110: NO), the operation returns to step 102. Otherwise (S110: YES), the operation proceeds to step S112.

The controller 33 calculates the offset correction value and the gain correction value based on the maximal values and the minimal values (S112). In detail, it calculates an average sine value between the maximal sine value and the minimal sine value as the offset sine correction value. It also calculates an average cosine value between the maximal cosine value and the minimal cosine vale as the offset cosine correction value. The controller 33 calculates a differential ΔT1 between the maximal sine value and the minimal sine value. Then, it calculates a ratio ΔTs1/ΔT1 between a standard sine differential ΔTs1 and the differential ΔT1 as the gain sine correction value. The controller 33 calculates a differential ΔT2 between the maximal cosine value and the minimal cosine value. Then, it calculates a ratio ΔTs2/ΔT2 between a standard cosine differential ΔTs2 and the differential ΔT2 as the gain cosine correction value. Each of the standard sine and cosine differentials ΔTs1, ΔTs2 does not have the offset error.

The standard sine and cosine differentials ΔTs1, ΔTs2 are digital standard values when the sine signal and the cosine signal do not have the offset error and the gain error. The maximal values of the standard sine and cosine differentials ΔTs1, ΔTs2 are equal to a digital value corresponding to 5 volts. The zero values of the standard sine and cosine differentials ΔTs1, ΔTs2 are equal to a digital value corresponding to 2.5 volts. The minimal values of the standard sine and cosine differentials ΔTs1, ΔTs2 are equal to a digital value corresponding to 0 volt.

Then, the controller 33 checks the correction values, which are constructed of the offset correction values and the gain correction values, whether the correction values are within a predetermined range angle with an angle conversion (S114). The predetermined range angle is within 10 degrees. When the correction values are out of the predetermined range (S114: Abnormal), the controller 33 determines that the correction values are an abnormal, and then the operation proceeds to step S118. When the correction values are within the predetermined range (S114: Normal), the controller 33 determines that the correction values are a normal, and the operation proceeds to step S116. The controller 33 updates the value of the first register 321 to the average sine value, and the value of the third register 325 to the average cosine value. It also updates the value of the second register 323 to the ratio ΔTs1/ΔT1 as the gain correction value for the sine signal, and the value of the fourth register 327 to the ratio ΔTs2/ΔT2 as the gain correction value for the cosine signal (S116). The controller 33 resets the timer (S118), then the operation returns to step S102.

According to the embodiment with respect to the offset correction, the motor control system for correcting the offset of the output signal produced from the resolver includes the picking function, the calculating function, and the correcting function. The picking function picks the maximal value and the minimal value from the output signal for the certain time period. The calculating function calculates the average value between the maximal value and the minimal value. Then, the correcting function corrects the offset of the output signal based on the average value.

In detail, an analog value of the output signal is converted to the angle. The zero value for the analog value corresponds to the predetermined bias voltage Vb (for example, 2.5 volts) in reality. Thus, if the bias voltage Vb fluctuates, the offset error occurs in the converted angle in response to the fluctuation.

The resolver periodically produces the maximal value and the minimal value of the output signal by turns in response to the rotational speed when the rotary device rotates. Since amplitude between the zero value and the maximal value is equal to amplitude between the zero value and the minimal value, the average value between the maximal value and the minimal value corresponds to the zero value.

If the bias voltage Vb fluctuates, an instantaneous value of the output signal fluctuates. However, in such a correcting function of the present invention, the maximal value, the minimal value, and the average value fluctuate as the bias voltage Vb fluctuates. As a result, the correcting function can accurately correct the fluctuation of the bias voltage (zero voltage), which is the offset.

When the rotary device does not rotate greater than predetermined degrees in the same rotational direction, the average value between the maximal value and the minimal value cannot be calculated. The predetermined angles correspond to one turn of the resolver. Whether the rotary device rotates greater than the predetermined angles is determined by rotational angle data or multiplication data that is multiplied a rotational angle speed by a time.

If the rotary device rotates greater than the predetermined angles, preferably several turns of the resolver, the average value is calculated as the zero value. As a result, the correcting function can easily correct the offset with accuracy. The zero value corresponds to 0 degree and 180 degrees in the sine signal, and 90 degrees and 270 degrees in the cosine signal.

According to the embodiment with respect to the gain correction, the motor control system for correcting a gain of an output signal produced from the resolver includes the picking function, the calculating function, and the correcting function. The picking function picks the maximal sine value and the minimal sine value from the sine output signal included in the output signal, and the maximal cosine value and the minimal cosine value from the cosine output signal included in the output signal for a certain time period. The calculating function calculates the first differential value between the maximal sine value and the minimal sine value, and the second differential value between the maximal cosine value and the minimal cosine value. Then, the correcting function corrects the gain differential between the sine output signal and the cosine output signal based on the first and second differential values.

In detail, the method corrects the gain by using a first ratio and a second ratio, or a first differential and a second differential. The first ratio and the first differential are calculated based on the maximal value and the minimal value of the sine output signal. The second ratio and the second differential are calculated based on the maximal value and the minimal value of the cosine output signal. Then, the method corrects the gain so that the first ratio is equal to the second ratio, or the first differential is equal to the second differential. Accordingly, the gain differential between the sine and cosine output signals is corrected with accuracy.

The angle of the rotary device is calculated based on the sine output signal and the cosine output signal by using a conversion expression or map data. For example, the conversion expression is expressed by an equation, $\tan \theta = $ sine output signal/cosine output signal, where "$\theta$" is the rotational angle. If both analog voltages of the sine output signal and the cosine output signal have errors of the gain differential, the calculated angle is not accurate.

The resolver periodically produces the maximal value and the minimal value of the output signal by turns in response to the rotational speed when the rotary device rotates. Thus, the differential between the maximal value and the minimal value does not have the offset error. Further, the sine differential between the maximal value and the minimal value of the sine output signal is originally equal to the cosine differential between the maximal value and the minimal value of the cosine output signal. The gain differential causes the differential between the sine differential (twice amplitude of the sine output signal) and the cosine differential (twice amplitude of the cosine output signal).

The sine differential ΔVs is calculated by the equation, ΔVs=Vmax−Vmin, where "Vmax" is the maximal value and "Vmin" is the minimal value. The cosine differential ΔVc is also calculated by the equation, ΔVc=Vmax−Vmin. Then, the sine output signal is multiplied by the ratio ΔVc/ΔVs. As a result, the amplitude ((the maximal value Δvmax−the minimal value Δvmin)/2) of the sine output signal is equal to that of the cosine output signal. Accordingly, the gain differential between the sine and cosine output signals is corrected with accuracy and easily.

The correction function, which has the offset correction function and the gain correction function, is performed periodically. The correction operation is inhibited when the offset and the gain are out of predetermined ranges. That is, the correction operation is inhibited when unusual maximal and minimal values are detected in an unusual condition, such as breaking in windings of the rotary device, and quickly changing in the rotational direction. As a result, the system can maintain the accuracy of the angle detection even in the unusual condition.

The correction function is also inhibited when the output wave signal of the resolver is in the abnormal condition. The abnormal condition is not a normal condition, such as that the output signal stay in a predetermined level for a certain time period, and no periodic fluctuation. As a result, the system can maintain the accuracy of the angle detection even in the abnormal condition.

The correction function is also inhibited when the rotational speed is greater than the predetermined speed or the rotational direction is reversed. When the rotary device is in a high-speed rotation, the maximal value and the minimal value are influenced by the carrier wave signal. When the rotational direction is reversed close to the maximum value and the minimal value, the resolver does not detect the maximum value and the minimum value with accuracy. This is because that the reverse of the rotational direction influences wave forms of the sine and cosine wave signals. As a result, the system can maintain the accuracy of the angle detection even when the rotational speed is greater than the predetermined speed or the rotational direction is reversed.

The present invention should not be limited to the embodiments previously discussed and shown in the figures, but may be implemented in various ways without departing from the spirit of the invention. For example, in the foregoing embodiments, the both gains of the sine signal and the cosine signal are corrected so that the differentials between the maximal value and the minimal value correspond to the predetermined value. However, the controller 33 may correct the gain by another way. That is, the controller 33 calculates a ratio between the amplitude of the sine signal and that of the cosine signal. Then, it corrects the gain differential by multiplying the ratio by either the sine signal or the cosine signal so that the amplitude of the sine signal is equal to the amplitude of the cosine signal.

What is claimed is:

1. A method for correcting a gain of an output signal produced from a resolver that detects a rotation of a rotary device, the method comprising:

picking, for a certain time period, a maximal sine value and a minimal sine value from a sine output signal included in the output signal, and a maximal cosine value and a minimal cosine value from a cosine output signal included in the output signal;

calculating a first differential value between the maximal sine value and the minimal sine value, and a second differential value between the maximal cosine value and the minimal cosine value;

correcting a gain differential between the sine output signal and the cosine output signal based on the first and second differential values; and determining a candidate gain differential between the sine output signal and the cosine output signal based on the first and second differential values before the correcting, wherein the correcting is performed periodically or at a start of the method, and is inhibited when the candidate gain differential is out of a certain range.

2. A method for correcting a gain of an output signal produced from a resolver that detects a rotation of a rotary device, the method comprising:

picking, for a certain time period, a maximal sine value and a minimal sine value from a sine output signal included in the output signal, and a maximal cosine value and a minimal cosine value from a cosine output signal included in the output signal;

calculating a first differential value between the maximal sine value and the minimal sine value, and a second differential value between the maximal cosine value and the minimal cosine value;

correcting a gain differential between the sine output signal and the cosine output signal based on the first and second differential values;

determining whether the output signal of the resolver is abnormal; and inhibiting the correcting when the output signal of the resolver is determined to be abnormal.

3. A method for correcting a gain of an output signal produced from a resolver that detects a rotation of a rotary device, the method comprising:

picking, for a certain time period, a maximal sine value and a minimal sine value from a sine output signal included in the output signal, and a maximal cosine value and a minimal cosine value from a cosine output signal included in the output signal;

calculating a first differential value between the maximal sine value and the minimal sine value, and a second differential value between the maximal cosine value and the minimal cosine value;

correcting a gain differential between the sine output signal and the cosine output signal based on the first and second differential values;

detecting whether a rotational speed of the rotary device is not greater than a certain speed and a rotational direction of the rotary device is not reversed; and inhibiting the correcting when the rotational speed is determined to be greater than the certain speed or the rotational direction is determined to be reversed.

4. The method according to claim 1, wherein the correcting is performed periodically or at a start of the method.

5. The method according to claim 2, wherein the correcting is performed periodically or at a start of the method.

6. The method according to claim 3, wherein the correcting is performed periodically or at a start of the method.

* * * * *